US009981576B2

(12) United States Patent
Tarade et al.

(10) Patent No.: US 9,981,576 B2
(45) Date of Patent: May 29, 2018

(54) END STOP WITH FREE PLAY ELIMINATION TO IMPROVE STIFFNESS

(71) Applicant: Lear Corporation, Southfield, MI (US)

(72) Inventors: Kishore Tarade, Ergolding (DE); Rafal Pater, Oberding-Schwaig (DE)

(73) Assignee: LEAR CORPORATION, Southfield, MI (US)

( * ) Notice: Subject to any disclaimer, the term of this patent is extended or adjusted under 35 U.S.C. 154(b) by 0 days. days.

(21) Appl. No.: 15/496,384

(22) Filed: Apr. 25, 2017

(65) Prior Publication Data

US 2017/0341542 A1    Nov. 30, 2017

(30) Foreign Application Priority Data

May 25, 2016 (DE) .................. 10 2016 209 053

(51) Int. Cl.
*B60N 2/427* (2006.01)
*B60N 2/433* (2006.01)

(52) U.S. Cl.
CPC ......... *B60N 2/433* (2013.01); *B60N 2/42709* (2013.01)

(58) Field of Classification Search
CPC ........................... B60N 2/42709; B60N 2/433
USPC .............................. 297/216.1, 452.18, 468
See application file for complete search history.

(56) References Cited

U.S. PATENT DOCUMENTS

| 4,229,041 A | * | 10/1980 | Werner | ................... B60R 22/26 297/216.1 |
| 6,056,320 A | * | 5/2000 | Khalifa | ................... B60R 22/28 280/805 |
| 6,902,234 B2 | * | 6/2005 | Becker | ...................... B60N 2/43 297/216.1 |
| 7,036,878 B2 | * | 5/2006 | Masutani | ................. B60N 2/43 297/216.1 |
| 7,303,229 B2 | | 12/2007 | Fujita et al. | |
| 7,854,477 B2 | | 12/2010 | Axelsson et al. | |
| 7,992,934 B2 | | 8/2011 | Cailletau | |
| 8,282,162 B2 | * | 10/2012 | Masutani | ................. B60N 2/43 297/216.1 |
| 8,955,906 B2 | | 2/2015 | Evans | |

FOREIGN PATENT DOCUMENTS

| DE | 20111521 U1 | 10/2001 |
| DE | 10260580 B3 | 9/2004 |
| DE | 20 2015 103395 U1 | 7/2015 |

OTHER PUBLICATIONS

German Office Action dated Sep. 21, 2017 for German Appn. No. DE 10 20162090534 filed May 25, 2016, 5 pgs.

* cited by examiner

*Primary Examiner* — Anthony D Barfield
(74) *Attorney, Agent, or Firm* — Brooks Kushman P.C.

(57) ABSTRACT

An end stop assembly includes a pivot bracket, an end stop bracket, a strap, and a pin assembly. The pivot bracket defines a first adjustment slot and a first pivot hole. The end stop bracket defines a second adjustment slot and a second pivot hole. The end stop bracket has a first stop tab positioned about the second pivot hole. The second pivot hole is held concentrically to the first pivot hole. The strap defines an attachment hole. The pin assembly holds the strap and end stop bracket to the pivot bracket. The pin assembly is positioned through the first adjustment slot, the second adjustment slot and the attachment hole such that the pin assembly is movable by along the first adjustment slot and the second adjustment slot from a first position to a second position by pulling the strap.

19 Claims, 5 Drawing Sheets

END STOP WITH FREE PLAY ELIMINATION TO IMPROVE STIFFNESS

CROSS-REFERENCE TO RELATED APPLICATIONS

This application claims foreign priority benefits under 35 U.S.C. § 119(a)-(d) to DE 10 2016 209 053.4, filed May 25, 2016, the disclosure of which is hereby incorporated by reference in their entirety.

TECHNICAL FIELD

In at least one aspect, the present invention is related to vehicle seat components that reduce unintentional movement after installation.

BACKGROUND

Successful automotive vehicle design requires consideration of numerous diverse design objectives. Components comprising the automobile must often meet criteria ranging from strength and durability to style and comfort. Moreover, increased functionality combined with ease of installation is also important vehicle design characteristics.

The prior art teaches an automotive seat that includes a seat cushion, and a backrest pivotally mounted to the seat cushion so that the backrest may be reclined at a selected angle relative to the seat cushion for comfort. To improve seat comfort, a headrest is often defined on the upper portion of the backrest, for example, by supporting a cushion atop the backrest using a pair of posts that are slidably received in complementary guides defined in the upper portion of the backrest frame. In some vehicle seat designs, components are assembled within specified tolerances that can result in some free play (i.e., movement). Free play is known to be particularly prevalent in designs that attach a rear seat to a bracket on the floor of the vehicle. In these situations, small movements of the bracket result in relatively large movements at the top of the vehicle seatback.

Accordingly, there is a need for improved seatback designs with lower amounts of free play at the attachment brackets.

SUMMARY

In at least one embodiment, the present invention solves one or more problems of the prior art by providing an end stop assembly for a vehicle seatback frame. The end stop assembly includes a pivot bracket, an end stop bracket, a strap, and a pin assembly. The pivot bracket has one or more attachment sections for securing the pivot bracket to a vehicle. The pivot bracket defines a first adjustment slot and a first pivot hole. The end stop bracket defines a second adjustment slot and a second pivot hole. The end stop bracket has a first stop tab positioned about the second pivot hole. The second pivot hole is held concentrically to the first pivot hole. The strap defines an attachment hole. The strap may have a weak point. The pin assembly holds the strap and end stop bracket to the pivot bracket. The pin assembly is positioned through the first adjustment slot, the second adjustment slot and the attachment hole such that the pin assembly is movable by along the first adjustment slot and the second adjustment slot from a first position to a second position by pulling the strap. The first position is more distant from the first pivot hole than the second position wherein when the pin assembly is at the first position, the first stop tab is positioned at a first tab position and when the pin assembly is positioned at the second position, the first stop tab is positioned at a second tab position that is rotated with respect to the first tab position. Advantageously, the end stop assembly eliminates free play when installed in a vehicle seat thereby reducing rearward rotation of the seatback.

In another embodiment, a vehicle seat having an end stop assembly that reduces free play is provided. The vehicle seat includes a seat bottom, a seatback having a seatback frame, and an end stop attached to the seat back frame. The seatback has a seatback frame and a pivot pin attached to the seatback frame. Characteristically, the end stop assembly is of the design set forth above. The pivot pin has a pivot rod section and an end section which includes a second stop tab that opposes the first stop tab of the end stop assembly.

In another embodiment, a method of assembling a vehicle seat having an end stop assembly that reduces free play is provided. The method includes a step of attaching an end stop assembly to a vehicle floor. The end stop assembly is of the general design set forth above. A seatback frame is attached to the end stop assembly. The seatback frame has a pivot pin extending from a bottom edge of the seatback frame. The pivot pin has a pivot rod section and an end section with the end section having a second stop tab. The seatback frame is attached to the end stop assembly by positioning the pivot pin in the first pivot hole such that there is a gap between the second tab stop and the second tab stop. A user pulls the strap such that the first tab stop contacts the second tab stop.

DETAILED DESCRIPTION

Reference will now be made in detail to presently preferred compositions, embodiments and methods of the present invention, which constitute the best modes of practicing the invention presently known to the inventors. The Figures are not necessarily to scale. However, it is to be understood that the disclosed embodiments are merely exemplary of the invention that may be embodied in various and alternative forms. Therefore, specific details disclosed herein are not to be interpreted as limiting, but merely as a representative basis for any aspect of the invention and/or as a representative basis for teaching one skilled in the art to variously employ the present invention.

Except in the examples, or where otherwise expressly indicated, all numerical quantities in this description indicating amounts of material or conditions of reaction and/or use are to be understood as modified by the word "about" in describing the broadest scope of the invention. Practice within the numerical limits stated is generally preferred. It is also to be understood that this invention is not limited to the specific embodiments and methods described below, as specific components and/or conditions may, of course, vary. Furthermore, the terminology used herein is used only for the purpose of describing particular embodiments of the present invention and is not intended to be limiting in any way.

It must also be noted that, as used in the specification and the appended claims, the singular form "a," "an," and "the" comprise plural referents unless the context clearly indicates otherwise. For example, reference to a component in the singular is intended to comprise a plurality of components.

Figure 1:
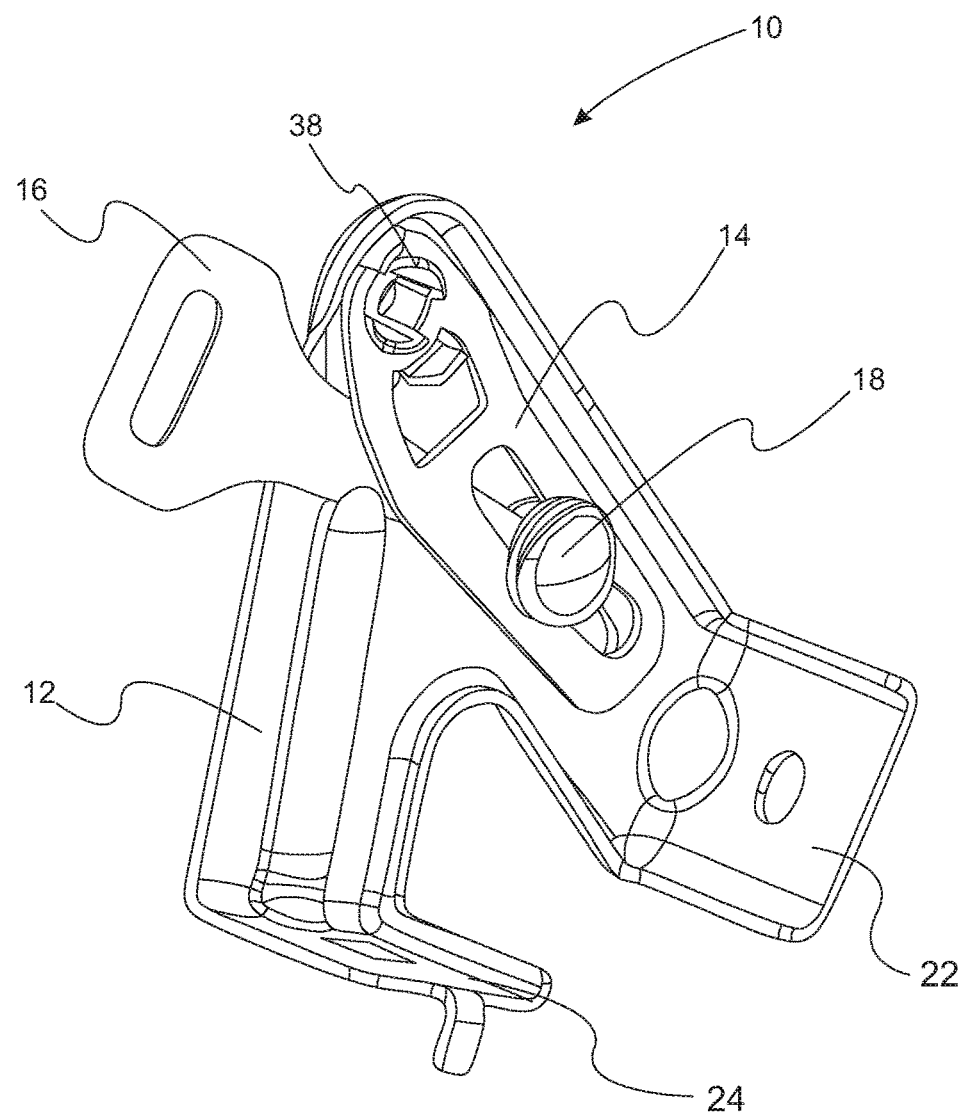
FIG. 1 is a perspective view of an end stop assembly for use in a vehicle seat to reduce free play.
Figure 2:
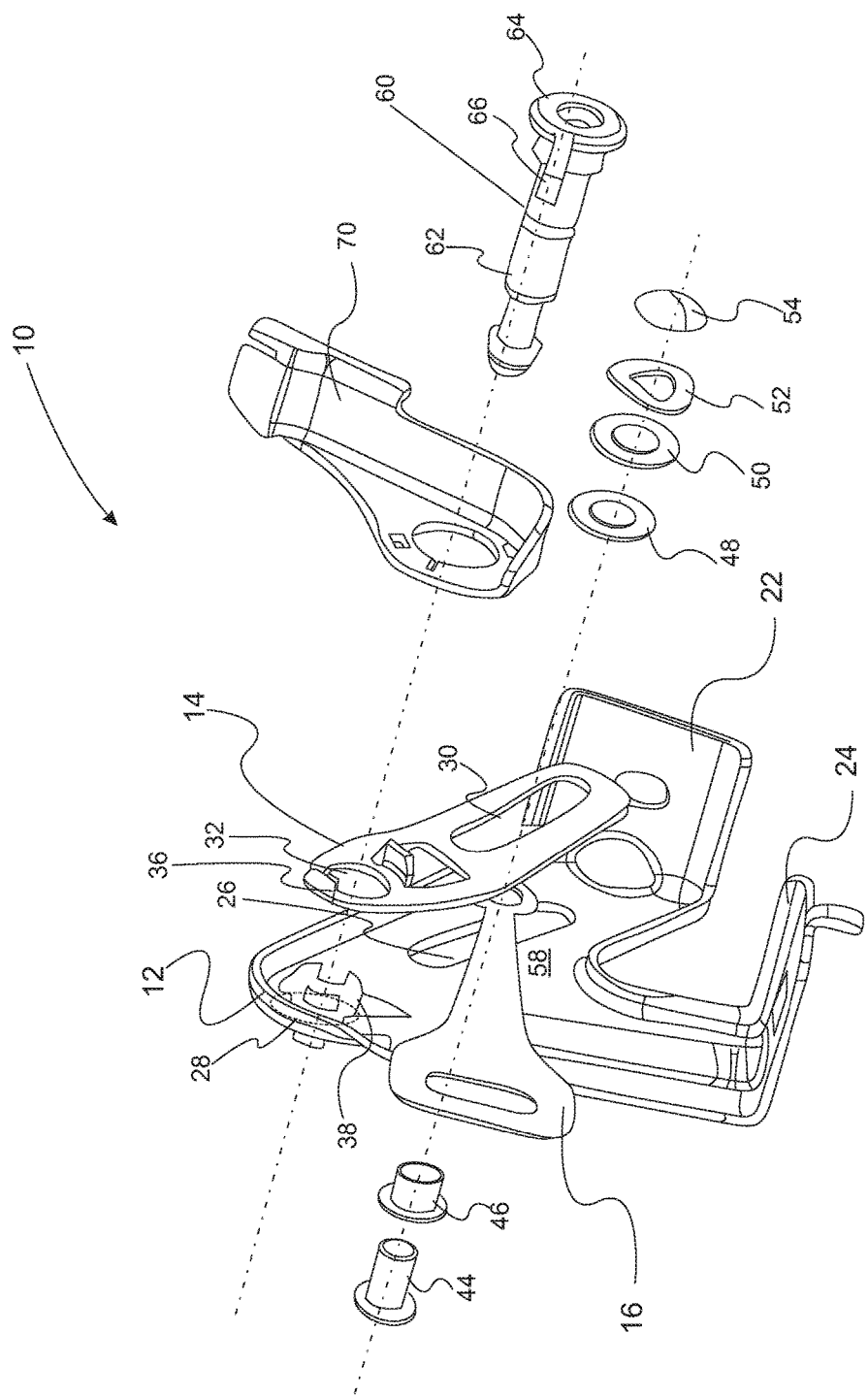
FIG. 2 is an exploded perspective view of the end stop assembly of FIG. 1.
Figure 3:
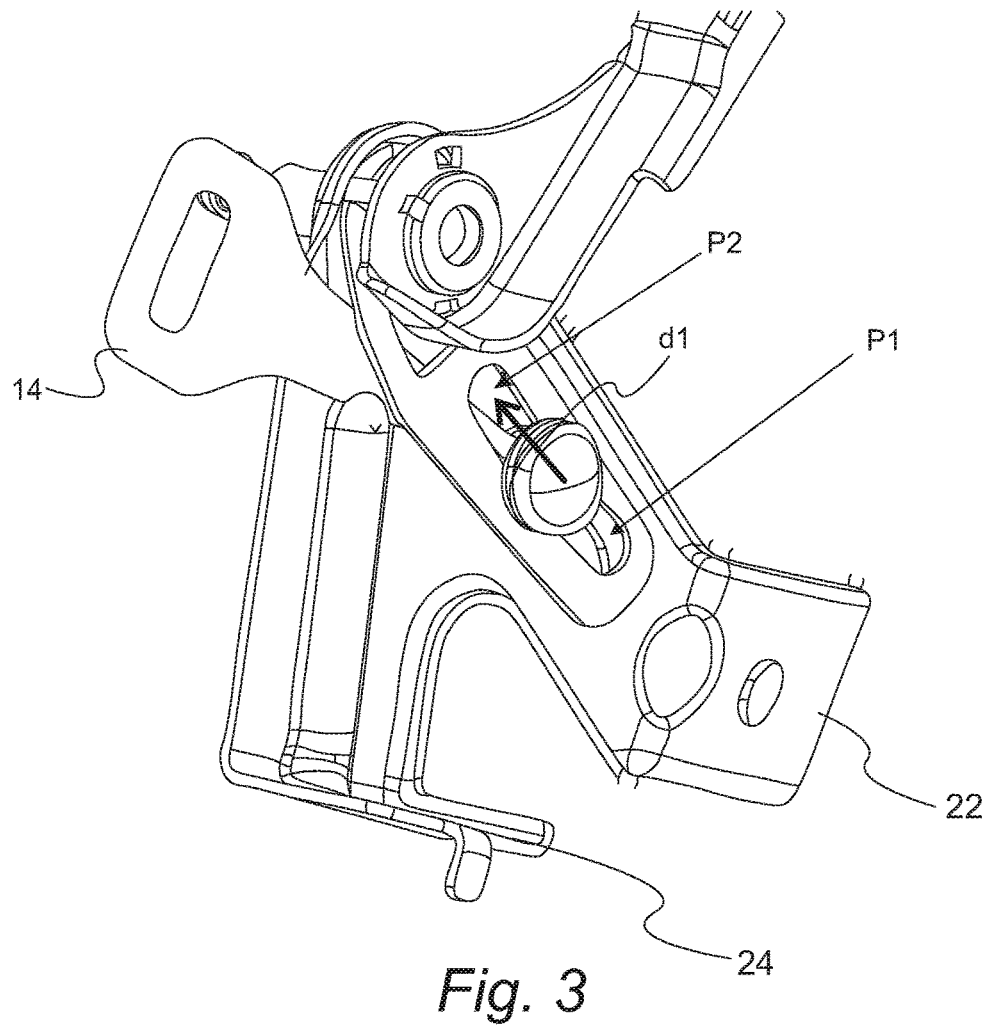
FIG. 3 is an perspective view of the end stop assembly of FIG. 1 with a seatback frame bracket attached.

With reference to FIGS. 1-3, an end stop assembly for a vehicle seatback frame that eliminates free play is provided. End stop assembly 10 includes a pivot bracket 12, an end stop bracket 14, a tear-away strap 16, and a pin assembly 18. Pivot bracket 12 has one or more attachment sections 22, 24 for securing the pivot bracket to a vehicle. Pivot bracket 12 defines a first adjustment slot 26 and a first pivot hole 28. End stop bracket 14 defines a second adjustment slot 30 and a second pivot hole 32. End stop bracket 14 has a first stop tab 36 positioned about the second pivot hole 32. Second pivot hole 32 is held concentrically to first pivot hole 28, typically by pivot bushing 38. Tear-away strap 14 defines attachment hole 40. Characteristically, the tear-away strap 14 has a weak point 42. Pin assembly 18 holds the tear-away strap 14 and end stop bracket 14 to the pivot bracket 12. In a refinement, tear-away strap is interposed between end stop bracket 14 and pivot bracket 12. Pin assembly 18 is positioned through the first adjustment slot 26, the second adjustment slot 30, and attachment hole 40 such that the pin assembly 18 is movable by along the first adjustment slot 26 and the second adjustment slot 30 from a first position $P_1$ to a second position $P_2$ by pulling the tear-away strap 14. The first position $P_1$ is more distant from the first pivot hole 28 than the second position $P_2$ wherein when the pin assembly 18 is at the first position $P_1$, the first stop tab 36 is positioned at a first tab position and when the pin assembly 18 is positioned at the second position, the first stop tab is positioned at a second tab position that is rotated with respect to the first tab position.

Pin assembly 18 includes pin 44, plastic bushing 46, plastic washer 48, washer 50, spring washer 52, and lock washer 54. Head section 56 of pin 44 is larger than the width of first adjustment slot 26 such that the head is positioned on the opposite side of pivot bracket 12 than the side 58 over which end stop bracket 14 and tear-away strap 16 are positioned. The elongated portion of pin 44 is positioned in first adjustment slot 26, attachment hole 40, second adjustment slot 30, plastic washer 48, washer 50, spring washer 52, and lock washer 54. Plastic washer 48 is disposed over end stop bracket 14, washer 50 is positioned over plastic washer 48, and spring washer 52 is positioned over washer 50. Lock washer 54 is positioned at the end of pin 44 to hold the components in place. Plastic washer 48, washer 50, spring washer 52, and lock washer 54 are larger than the width of second adjustment slot 30.

Still referring to FIGS. 1-3, end stop assembly 10 is adapted to receive pivot pin 60 attached to a seat back frame. Pivot pin 60 has pivot rod section 62 and an end section 64. End section 64 includes a second tab stop 66. Pivot pin 60 is attached to seat frame bracket 70 which is attached to a vehicle seatback frame. Moreover, second tab stop 66 is held fixed relative to seat frame bracket 70. When a vehicle frame is initially attached to end stop assembly 10, first tab stop 36 faces second tab stop 66 with a gap between the first tab stop and the second tab stop.

Figure 4:
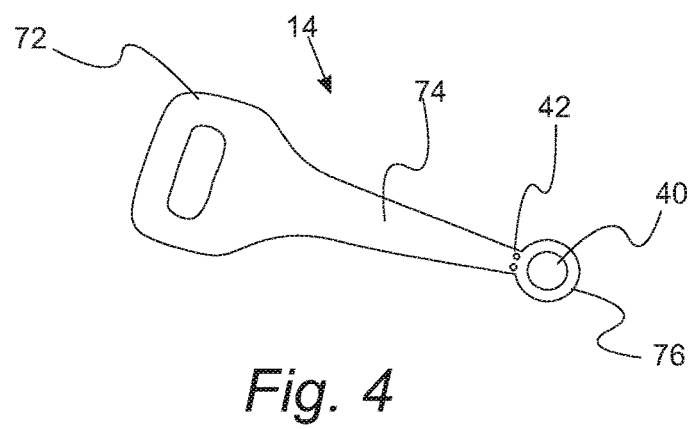
FIG. 4 is a top view of a tear-away strap used in the end stop assembly of FIG. 1.

With reference to FIG. 4, a side view of the tear-away strap is provided. Tear-away strap ear-away strap 16 includes a head section 72, an elongated section 74 extending from the head section, and a connection section 76 that defines the attachment hole 40. Connection section 76 is positioned on an opposite end of the elongated section than head section 72.

Figure 5:
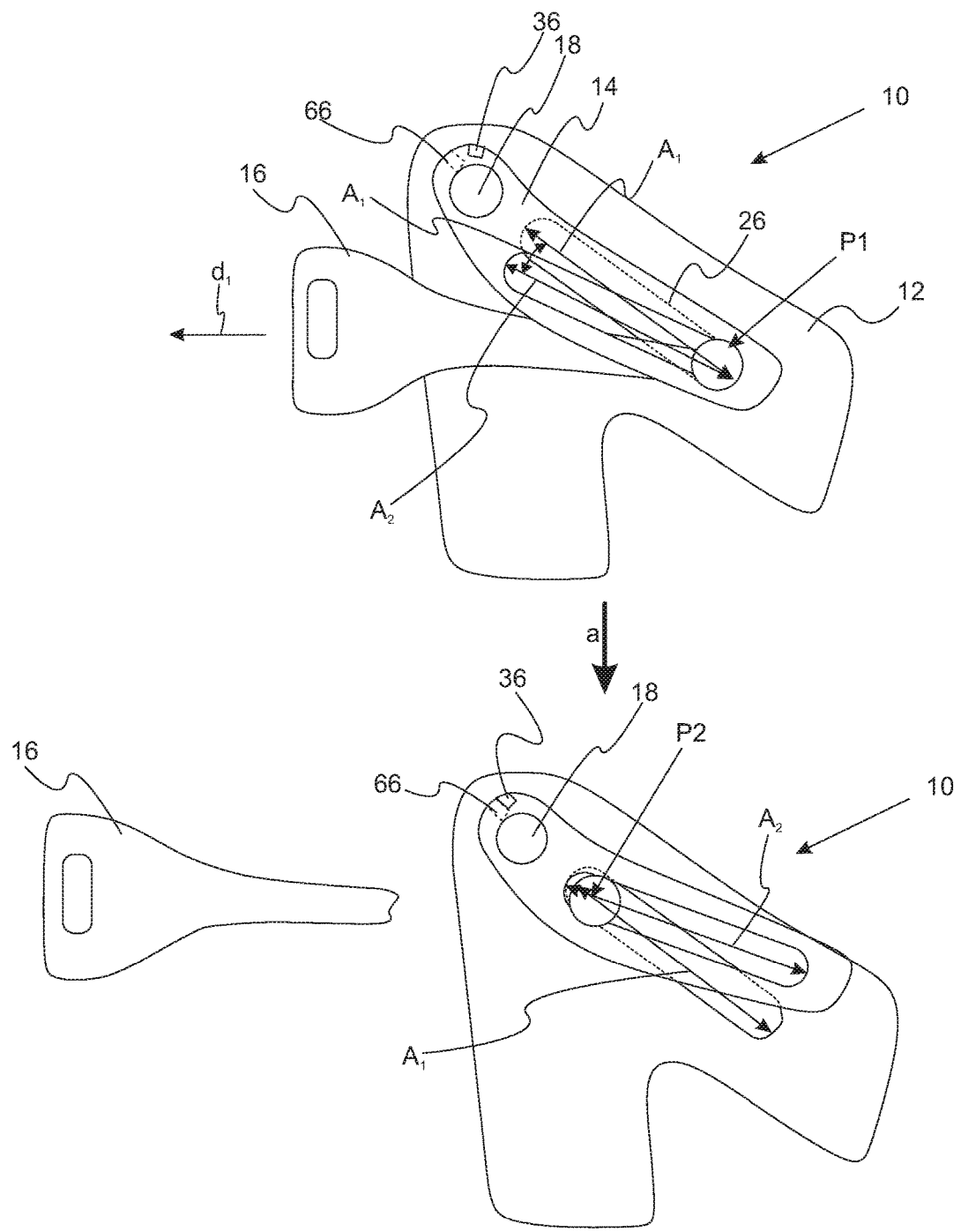
FIG. 5 is a schematic flow chart showing the positioning of the end stop assembly of FIG. 1 in a position with reduced free play.

With reference to FIG. 5, the setting of end stop 10 to a position with reduced free play is schematically illustrated. As set forth above, pivot bracket 12 defines first adjustment slot 26 while end stop bracket 14 defines second adjustment slot 30. Longitudinal axis $A_1$ is defined along the long direction of first adjustment slot 26 and longitudinal axis $A_2$ is defined along the long direction of second adjustment slot 30. Initially, pin assembly 18 is positioned at first position $P_1$. After end stop 10 is attached to a seatback frame and installed in a vehicle, tear-away strap is pulled along direction $d_1$ to a second position $P_2$ as indicated in step a). The first position $P_1$ is more distant from the first pivot hole 28 than the second position $P_2$. When the pin assembly 18 is at the first position $P_1$, the first stop tab 36 is positioned at a first tab position with a gap between first stop tab 36 and second stop tab 66. When the pin assembly 18 is at the second position $P_2$, the first stop tab 36 is positioned at a second tab position without a gap between first stop tab 36 and second stop tab 66, i.e., first stop tab 36 contacts second stop tab 66. Pin 44 of pin assembly 18 is held at position P2 by frictional forces caused by a scissoring effect between first adjustment slot 26 and second adjustment slot 30 under the forces of gravity. In a refinement, in order to ensure rotation of first stop tab 36 to a position in which it contact second stop tab 66, first longitudinal axis $A_1$ is at a first angle $AN_1$ with respect to the second longitudinal axis $A_2$ when the pin assembly is in the first position $P_1$. For example, $AN_1$ can be from 1 to 20 degrees.

Figure 6:
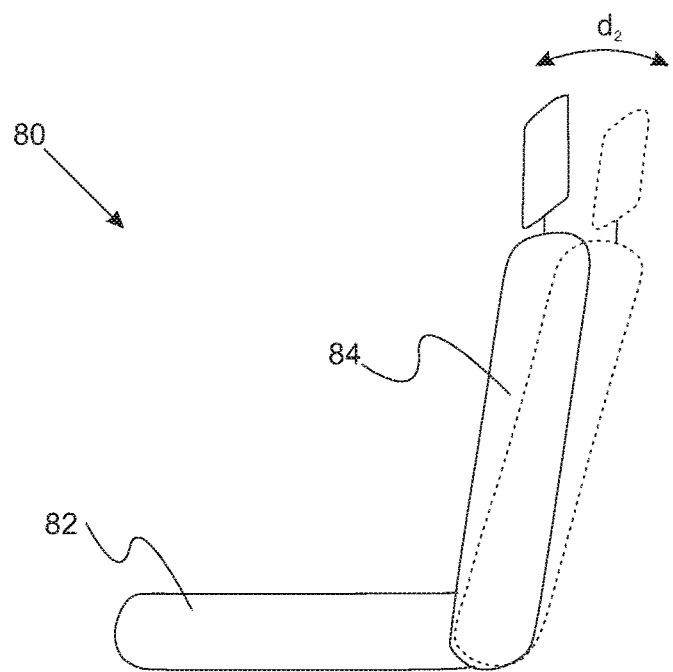
FIG. 6 is a schematic side view of a vehicle seat showing movement related to free play.
Figure 7:
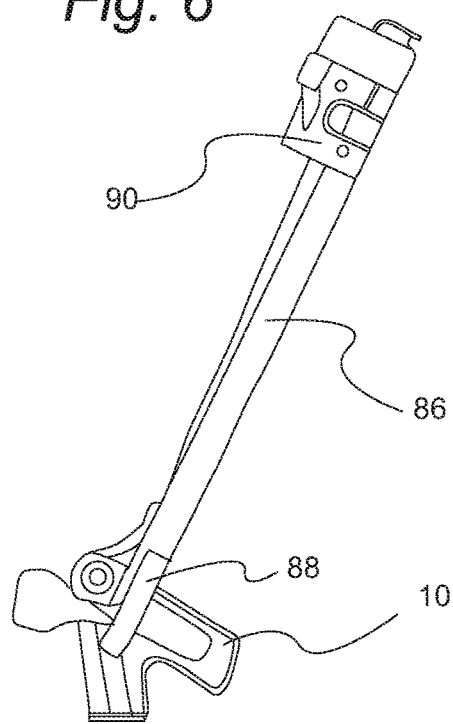
FIG. 7 is a schematic side view showing a seatback frame connected to an end stop bracket assembly.

With reference to FIGS. 6 and 7, the incorporation of the end stop assembly in a vehicle seat is schematically illustrated. FIG. 6 is a schematic side view of a vehicle seat showing movement related to free play. FIG. 7 is a schematic side view showing a seatback frame connected to an end stop bracket assembly. FIG. 8 is a schematic front view of a vehicle rear seat incorporating the end stop assemblies. Vehicle seat 80 includes seat bottom 82 and seatback 84. Seatback 84 includes seatback frame 86. FIG. 6 shows that free play at the bracket connecting the seatback frame to a vehicle floor results in movement of the seat back along direction $d_2$. For example, small amounts of free play at the bracket results in much larger movement at the top of seat back 84. In the present embodiment, this free play is reduced or eliminated by end bracket assembly 10 which is described above in detail. In FIG. 7, end stop assembly is attached to post 88 of seatback frame 86. In a refinement, seatback frame 86 includes an upper corner lock 90 that can further secure vehicle seat 80 at the top. During assembly, end stop assembly 10 is attached to a vehicle floor. The end stop assembly is of the general design set forth above. Seatback frame 86 is attached to the end stop assembly 10. The seatback frame has a pivot pin 60 extending from a bottom edge of the seatback frame as described above with respect to FIG. 2. Pivot pin 60 has a pivot rod section 62 and an end section 64 with the end section having a second stop tab 66. Seatback frame 86 is attached to the end stop assembly 10 by positioning the pivot pin 60 in the first pivot hole 28 such that there is a gap between the second tab stop and the second tab stop as illustrated in FIG. 5. A user pulls the tear-away strap 16 such that the first tab stop 36 contacts the second tab stop 66 with the tear-away strap 16 separating at the weak point.

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

What is claimed is:

1. An end stop assembly for a vehicle seatback frame, the end stop assembly comprising:
    a pivot bracket having one or more attachment sections for securing the pivot bracket to a vehicle, the pivot bracket defining a first adjustment slot and a first pivot hole;
    an end stop bracket defining a second adjustment slot and a second pivot hole, the end stop bracket having a first stop tab positioned about the second pivot hole, the second pivot hole being held concentrically to the first pivot hole;
    a strap defining an attachment hole; and
    a pin assembly holding the strap and end stop bracket to the pivot bracket, the pin assembly being positioned through the first adjustment slot and the second adjustment slot and the attachment hole such that the pin assembly is movable by along the first adjustment slot and the second adjustment slot from a first position to a second position by pulling the strap, the first position being more distant from the first pivot hole than the second position wherein when the pin assembly is at the first position, the first stop tab is positioned at a first tab position and when the pin assembly is positioned at the second position, the first stop tab is positioned at a second tab position that is rotated with respect to the first tab position.

2. The end stop assembly of claim 1 further comprising a pivot bushing positioned that holds the second pivot hole concentrically to the first pivot hole.

3. The end stop assembly of claim 1 wherein the strap is plastic.

4. The end stop assembly of claim 1 wherein the strap includes a head section, an elongated section extending from the head section, and a connection section that defines the attachment hole, the connection section being positioned on an opposite end of the elongated section than the head section.

5. The end stop assembly of claim 1 wherein the first adjustment slot has a first longitudinal axis and the second adjustment slot has a second longitudinal axis, the first longitudinal axis being at a first angle with respect to the second longitudinal axis when the pin assembly is in the first position.

6. The end stop assembly of claim 1 wherein the end stop assembly is adapted to receive a pivot pin attached to a seat back frame the pivot pin having a pivot rod section and an end section, the end section having a second stop tab that face the first stop tab with a gap between the first stop tab and the second stop tab when the pin assembly is in the first position.

7. The end stop assembly of claim 6 wherein the second stop tab contacts the first stop tab when the strap is pulled to the second position.

8. The end stop assembly of claim 1, wherein the strap has a weak point.

9. A vehicle seat comprising:
    a seat bottom;
    a seatback having a seatback frame and a pivot pin attached to the seatback frame, the pivot pin having a pivot rod section and an end section; and
    an end stop assembly attached to the seatback frame, the end stop assembly including:
    a pivot bracket having one or more attachment sections for securing the pivot bracket to a vehicle, the pivot bracket defining a first adjustment slot and a first pivot hole;
    an end stop bracket defining a second adjustment slot and a second pivot hole, the end stop bracket having a first stop tab positioned about the second pivot hole, the second pivot hole being held concentrically to the first pivot hole;
    a tear-away strap defining an attachment hole and having a weak point; and
    a pin assembly holding the tear-away strap and end stop bracket to the pivot bracket, the pin assembly being positioned through the first adjustment slot and the second adjustment slot and the attachment hole such that the pin assembly is movable by along the first adjustment slot and the second adjustment slot from a first position to a second position by pulling the tear-away strap, the first position being more distant from the first pivot hole than the second position wherein when the pin assembly is at the first position, the first stop tab is positioned at a first tab position and when the pin assembly is positioned at the second position, the first stop tab is positioned at a second tab position that is rotated with respect to the first tab position, wherein the end section of the pivot pin has a second stop tab that face the first stop tab with a gap between the first tab stop and the second tab stop when the pin assembly is in the first position.

10. The vehicle seat of claim 9 further comprising an upper corner lock.

11. The vehicle seat of claim 9 wherein the end stop assembly further comprises a pivot bushing positioned that holds the second pivot hole concentrically to the first pivot hole.

12. The vehicle seat of claim 9 wherein the tear-away strap includes a head section, an elongated section extending from the head section, and a connection section that defines the attachment hole, the connection section being positioned on an opposite end of the elongated section than the head section.

13. The vehicle seat of claim 9 wherein the first adjustment slot has a first longitudinal axis and the second adjustment slot has a second longitudinal axis, the first longitudinal axis being at a first angle with respect to the second longitudinal axis when the pin assembly is in the first position.

14. The vehicle seat of claim 9 wherein the second stop tab contacts the first stop tab when the tear-away strap is pulled to the second position.

15. A method of assembling a vehicle seat, the method comprising:
    a) attaching an end stop assembly to a vehicle floor, the end stop assembly including:
    a pivot bracket having one or more attachment sections for securing the pivot bracket to a vehicle, the pivot bracket defining a first adjustment slot and a first pivot hole;

an end stop bracket defining a second adjustment slot and a second pivot hole, the end stop bracket having a first stop tab positioned about the second pivot hole, the second pivot hole being held concentrically to the first pivot hole;

a strap defining an attachment hole;

a pin assembly holding the strap and end stop bracket to the pivot bracket, the pin assembly being positioned through the first adjustment slot and the second adjustment slot and the attachment hole such that the pin assembly is movable by along the first adjustment slot and the second adjustment slot from a first position to a second position by pulling the strap, the first position being more distant from the first pivot hole than the second position wherein when the pin assembly is at the first position, the first stop tab is positioned at a first tab position and when the pin assembly is positioned at the second position, the first stop tab is positioned at a second tab position that is rotated with respect to the first tab position; and b) attaching a seatback frame to the end stop assembly, the seatback frame having a pivot pin extending from a bottom edge of the seatback frame, the pivot pin having a pivot rod section and an end section, the end section having a second stop tab, the seatback frame being attached to the end stop assembly by positioning the pivot pin in the first pivot hole such that there is a gap between the second tab stop and the second tab stop; and c) pulling the strap such that the first tab stop contacts the second tab stop.

16. The method of claim 15 wherein the strap has a weak point and in step c), the pin assembly is pulled by the strap towards the second pivot hole causing rotation of the end stop bracket until contact the first stop tab contacts the second stop tab and the strap separates at the weak point.

17. The method of claim 15 wherein the end stop assembly further comprising a pivot bushing positioned that holds the second pivot hole concentrically to the first pivot hole.

18. The method of claim 15 wherein the strap includes a head section, an elongated section extending from the head section, and a connection section that defines the attachment hole, the connection section being positioned on an opposite end of the elongated section than the head section.

19. The method of claim 15 wherein the first adjustment slot has a first longitudinal axis and the second adjustment slot has a second longitudinal axis, the first longitudinal axis being at a first angle with respect to the second longitudinal axis when the pin assembly is in the first position.

* * * * *

UNITED STATES PATENT AND TRADEMARK OFFICE
CERTIFICATE OF CORRECTION

| | | |
|---|---|---|
| PATENT NO. | : 9,981,576 B2 | Page 1 of 1 |
| APPLICATION NO. | : 15/496384 | |
| DATED | : May 29, 2018 | |
| INVENTOR(S) | : Kishore Tarade et al. | |

It is certified that error appears in the above-identified patent and that said Letters Patent is hereby corrected as shown below:

In the Claims

Column 5, Line 42, Claim 2:
After "pivot bushing"
Delete "positioned".

Column 6, Line 42, Claim 11:
After "pivot bushing"
Delete "positioned".

Column 6, Lines 35-36, Claim 9:
After "has a second stop tab that"
Delete "face" and
Insert -- faces --.

Column 8, Line 3, Claim 15:
After "between the second tab stop and"
Delete "the second tab stop" (second occurrence) and
Insert -- the first tab stop --.

Column 8, Line 10, Claim 16:
After "end stop bracket until"
Delete "contact".

Signed and Sealed this
Thirtieth Day of October, 2018

Andrei Iancu
*Director of the United States Patent and Trademark Office*